United States Patent
Ganev et al.

(10) Patent No.: US 7,952,316 B2
(45) Date of Patent: May 31, 2011

(54) VARIABLE FREQUENCY REDUCED SPEED VARIATION ELECTRIC DRIVE

(75) Inventors: Evgeni Ganev, Torrance, CA (US); Cuong V. Nguyen, Redondo Beach, CA (US); Thomas M. MacRunnel, Lomita, CA (US); Leroy A. Fizer, Huntington Beach, CA (US)

(73) Assignee: Honeywell International, Inc., Morristown, NJ (US)

( * ) Notice: Subject to any disclaimer, the term of this patent is extended or adjusted under 35 U.S.C. 154(b) by 907 days.

(21) Appl. No.: 11/868,329

(22) Filed: Oct. 5, 2007

(65) Prior Publication Data
US 2008/0265828 A1 Oct. 30, 2008

Related U.S. Application Data

(60) Provisional application No. 60/914,605, filed on Apr. 27, 2007.

(51) Int. Cl.
*H02P 1/38* (2006.01)
*H02P 27/00* (2006.01)

(52) U.S. Cl. ........................................ 318/773; 318/524

(58) Field of Classification Search .................. 318/727, 318/773–777, 151, 152, 496, 498, 523, 524, 318/704; 307/129
See application file for complete search history.

(56) References Cited

U.S. PATENT DOCUMENTS

| | | | | |
|---|---|---|---|---|
| 3,865,209 A | * | 2/1975 | Aihara et al. ................. | 180/65.1 |
| 4,039,909 A | | 8/1977 | Baker | |
| 4,467,257 A | * | 8/1984 | Douthart et al. .............. | 318/774 |
| 4,488,053 A | | 12/1984 | Cronin | |
| 4,488,100 A | * | 12/1984 | Fujii et al. ..................... | 318/798 |
| 4,937,513 A | * | 6/1990 | Hoemann et al. ............. | 318/772 |
| 5,079,494 A | * | 1/1992 | Reichard ........................ | 318/811 |
| 5,134,332 A | * | 7/1992 | Nakamura et al. ............ | 310/208 |
| 5,256,949 A | * | 10/1993 | Reichard et al. ......... | 318/400.01 |
| 5,614,799 A | * | 3/1997 | Anderson et al. ............. | 318/773 |
| 5,880,571 A | | 3/1999 | Seffernick et al. | |
| 5,925,999 A | | 7/1999 | Lakerdas et al. | |

(Continued)

FOREIGN PATENT DOCUMENTS

EP 0397891 A1 11/1990

(Continued)

OTHER PUBLICATIONS

European search report dated Aug. 13, 2008.

*Primary Examiner* — Eduardo Colon Santana
(74) *Attorney, Agent, or Firm* — Oral Caglar, Esq.

(57) ABSTRACT

A multiple-winding induction machine may be used to obtain a reduced-speed-variation electric drive when using a variable-frequency power distribution system. Each winding may have a different number of poles. The winding with the smallest number of poles may operate the machine at the lowest bus frequency, while the winding with the largest number of poles may operate the machine at the highest bus frequency. In one embodiment, a third winding, with a middle number of poles, may operate the machine at the middle frequency ranges. The speed of the induction machine is a function of the electrical frequency and the number of the winding poles. Therefore, the operating speed range can be reduced by switching from one winding to another. According to the present invention, windings with different numbers of poles can be designed to achieve different reductions in speed variation.

20 Claims, 5 Drawing Sheets

U.S. PATENT DOCUMENTS

| | | |
|---|---|---|
| 6,242,884 B1 | 6/2001 | Lipo et al. |
| 6,252,331 B1 | 6/2001 | Mildice et al. |
| 6,407,531 B1 | 6/2002 | Walters et al. |
| 6,414,412 B1 * | 7/2002 | Hao .............................. 310/200 |
| 6,445,079 B1 | 9/2002 | Gale et al. |
| 6,469,469 B1 | 10/2002 | Chambers et al. |
| 6,788,031 B2 * | 9/2004 | Pendell ........................... 322/44 |
| 6,839,249 B2 | 1/2005 | Kalman et al. |
| 7,696,715 B2 * | 4/2010 | Fisher et al. ................... 318/802 |
| 2006/0043916 A1 * | 3/2006 | Henslee et al. ............... 318/432 |

FOREIGN PATENT DOCUMENTS

EP      1267473   A2      12/2002

* cited by examiner

VARIABLE FREQUENCY REDUCED SPEED VARIATION ELECTRIC DRIVE

The present application claims the benefit of U.S. provisional patent application No. 60/914,605, filed Apr. 27, 2007.

BACKGROUND OF THE INVENTION

The present invention generally relates to apparatus and methods for obtaining electric drives with minimal speed variation and, more specifically, to apparatus and methods for using induction machines connected to a variable frequency power distribution system to obtain reduced speed variation in electric drives.

Power electronics for aerospace applications plays a significant role in the modern aircraft and spacecraft industry. This is particularly true in the area of more electric architecture (MEA) for aircraft and military ground vehicles.

The commercial aircraft business is moving toward non-bleed-air environmental control systems (ECS's), variable-frequency (VF) power distribution systems, and electrical actuation. Typical examples are the latest designs, such as the Boeing 787 and the Airbus super jumbo A380. The next-generation Boeing airplane (replacement of the 737) and the Airbus airplanes (replacement for the A320 and A350) will most likely use MEA.

Some military aircraft already utilize MEA, including using MEA for primary and secondary flight control. Military ground vehicles have migrated toward hybrid electric technology where the main power generation and propulsion employs electric machinery and associated power electronics. Therefore, substantial demand for high-performance electric drives has arisen.

In this environment, a need exists for electric drives for aircraft and ground military businesses for the following reasons: increased power levels to handle increased loads; reduced weights to accommodate large content increase per platform; reduced volume to accommodate electronics and electric machines in limited space; increased reliability; and reduced cost.

The power distribution systems for commercial and some military airplanes have been using constant-frequency 400 Hertz (Hz), 115-V AC power. The constant frequency created an opportunity to use an induction machine directly connected to the bus to obtain constant-speed electric drives. Hence, simple electric drives without solid-state power electronics are obtained, resulting in low weight and cost and high reliability. However, the most recent developments for MEA have changed the distribution systems to variable frequency. The speed of the induction machine connected to such a bus will follow the frequency variation, which in some cases is in a ratio of 1 to 2.5. To mitigate this problem to an acceptable speed variation, a power electronics converter with dual-conversion AC to DC and DC to AC is typically implemented. However the cost, weight, volume, and reliability of power electronics are still not affordable for application in variable frequency situations. In addition, additional forced cooling is often required to prevent the power electronics from overheating.

As can be seen, there is a need in the aerospace industry for a reliable low-cost electric drive that may be powered via a variable-frequency power distribution bus without the use of dual power conversion.

SUMMARY OF THE INVENTION

In one aspect of the present invention, a method for controlling speed variation in a motor comprises measuring a frequency of a power supply going to the motor, the motor having at least a first set of windings and a second set of windings; delivering power to the first set of windings when the frequency is within a first frequency range; and delivering power to the second set of windings when the frequency is within a second frequency range.

In another aspect of the present invention, a method for minimizing speed variation of a motor driven by a variable frequency power distribution system comprises feeding power from the power distribution system into a motor controller; monitoring a frequency of the power with the motor controller; delivering the power to a first set of windings having a first number of poles when the frequency is within a first frequency range; and delivering the power to a second set of windings having a second number of poles when the frequency is within a second frequency range, wherein the first number of poles is greater than the second number of poles; at least a portion of the first frequency range is greater than the second frequency range; and at least a portion of the first frequency range overlaps with a portion of the second frequency range.

In a further aspect of the present invention, a control logic for controlling a motor, the motor having at least a first set of windings and a second set of windings, comprises a circuit for reading a frequency of power on an AC bus; a first switch for directing power to the first set of windings when the frequency is in a first frequency range; and a second switch for directing power to the second set of windings when the frequency is in a second frequency range.

These and other features, aspects and advantages of the present invention will become better understood with reference to the following drawings, description and claims.

DETAILED DESCRIPTION OF THE INVENTION

Figure 1:
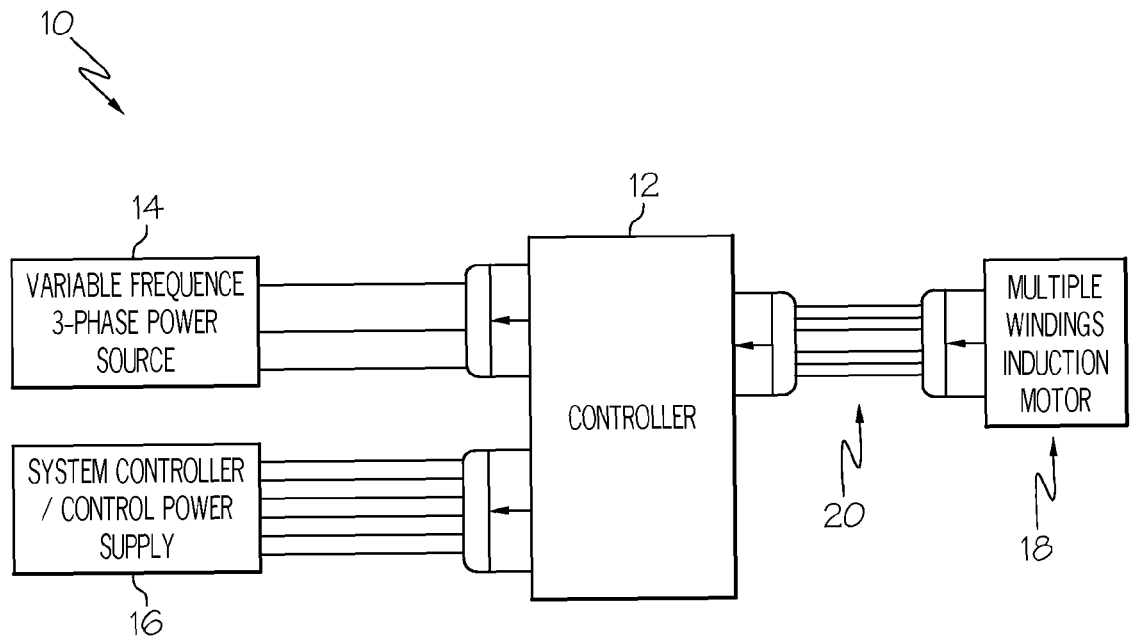
FIG. 1 is a schematic diagram of a system interface for a motor controller according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides apparatus and methods for obtaining a reduced-speed-variation electric drive when using a variable-frequency power distribution system. The apparatus and methods may use a multiple-winding induction machine. Each winding may have a different number of poles. The winding with the smallest number of poles may operate the machine at the lowest bus frequency, while the winding with the largest number of poles may operate the machine at the highest bus frequency. In one embodiment, a third winding, with a middle number of poles, may operate the machine at the middle frequency ranges. The speed of the induction machine is a function of the electrical frequency and the number of the winding poles. Therefore, the operating speed range can be reduced by switching from one winding to another. According to the present invention, windings with different numbers of poles can be designed to achieve different reductions in speed variation. The present invention may be useful in military ground vehicles, aircraft, industrial applications, and any application where minimal or no variation in motor speed is desired using a variable frequency power distribution system.

Unlike conventional power distribution systems, which may use a dual conversion of AC to DC and DC to AC to achieve a reduced speed variation in an electric drive, the present invention may provide an induction machine with multiple windings, whereby switching between the windings may provide a reduction in the speed variation of an electric drive. The approach of the present invention may offer the benefits of reduced weight, volume, cooling requirements, and cost of the electric drives. Moreover, improved reliability, efficiency, and EMI performance are expected with the systems of the present invention.

The proposed controller according to the present invention is not a conventional motor controller that requires double power conversion AC to DC and DC to AC. The inventive motor controller may contain only a small circuit board and several contactors and a small circuit board. The estimated power dissipation may be about 20 Watts, primarily in the coils of the contactors. Thus, the cooling problem, as compared to conventional motor controllers, may be trivial and no thermal issues are anticipated.

For a case of variable-frequency power source of 360 to 650 Hz, a possibility exists to build a dual-winding induction machine. According to one embodiment of the present invention, the first winding may operate the machine as a four-pole, the second as a six-pole. The speed of an electric machine is defined with $S=(f*60)/(n/2)$, where f is the frequency (Hz) of the power distribution bus and n is the number of poles. The actual motor speed will be slightly lower, as a result of the load-dependent slip which is inherent to an induction machine. From the formula, it is evident that the operating speed range can be reduced by switching from one winding to another. Windings with different numbers of poles can be designed to achieve different reductions in speed variation. More than two windings can be utilized, resulting in more than two speed ranges to achieve even smaller speed variations.

Multi-winding motors have been known in the art to typically provide multiple speeds from a constant frequency alternating current (AC) (or direct current (DC)) input. For example, U.S. Pat. Nos. 6,445,079 and 5,925,999, herein incorporated by reference, describe dual-winding motors. With respect to the present invention, a detailed motor design was performed for a 4/6-pole dual-winding motor. A three-phase, radial gap, squirrel-cage induction motor, as is known in the art, was used. A computer program was used to perform electromagnetic analysis of the motor. The calculated performance is summarized below:

| Item | Units | 4-Pole | 6-Pole |
|---|---|---|---|
| Torque (TQ) | in.-lb | 30.740 | 30.239 |
| Rpm | rpm | 11700 | 11748 |

-continued

| Item | Units | 4-Pole | 6-Pole |
|---|---|---|---|
| Pout | W | 4255 | 4203 |
| Vphase | Vrms | 230 | 230 |
| Iphase | Arms | 9.455 | 10.793 |
| Frequency | Hz | 400 | 600 |
| Efficiency | Percent | 82.221 | 80.469 |
| Power Factor (PF) | Percent | 79.329 | 70.139 |
| Pull-out TQ | in.-lb | 58.598 | 49.979 |
| Starting TQ | in.-lb | 18.294 | 10.904 |
| Starting Amps | Arms | 41.439 | 38.988 |
| Starting PF | Percent | 45.780 | 37.015 |

The stator of the motor may consist of two independent, wye-connected, three-phase stator windings with six power leads. One stator winding may be wound for four poles while the other stator winding may be wound for six poles. The four-pole winding may be located in the slot bottom, relegating the higher sensitivity to slot reactance for the higher-pole-count winding in the top of the slot, to minimize the contribution to leakage reactance for the higher reactance winding. Both windings may be wye-connected with no parallel circuits to preclude flux traps created by the unenergized winding. Also the 36/30 stator-rotor slot number combination, as is known in the art, may be used to avoid synchronous harmonic running and starting torques. Stator and rotor magnetic stack assemblies may be fully laminated with silicon steel and the rotor cage may be cast aluminum. The motor may produce 5.6 HP continuous output power with an electromagnetic weight (less structure and shaft) of 8.7 lb.

Referring to FIG. 1, there is shown a schematic diagram of a system interface 10 for a controller 12 according to the present invention. Three-phase, variable-frequency, 230-V AC may be supplied as a power source 14 for the controller 12. The source of this power could be either APU or the main engine generator (not shown). The APU frequency may be fixed at 400 Hz with small variation. The main engine source generator, during ground operation, may vary from about 360 to about 650 Hz. A signal interface 16 may be used to provide control power and transmit/receive commands/status signals between the system controller (not shown) and the motor controller 12. The interface between the electric machine windings 18 and the controller 12 may consist of six power circuits for the two windings and two signal circuits 20 for a temperature sensor (not shown).

Figure 2:
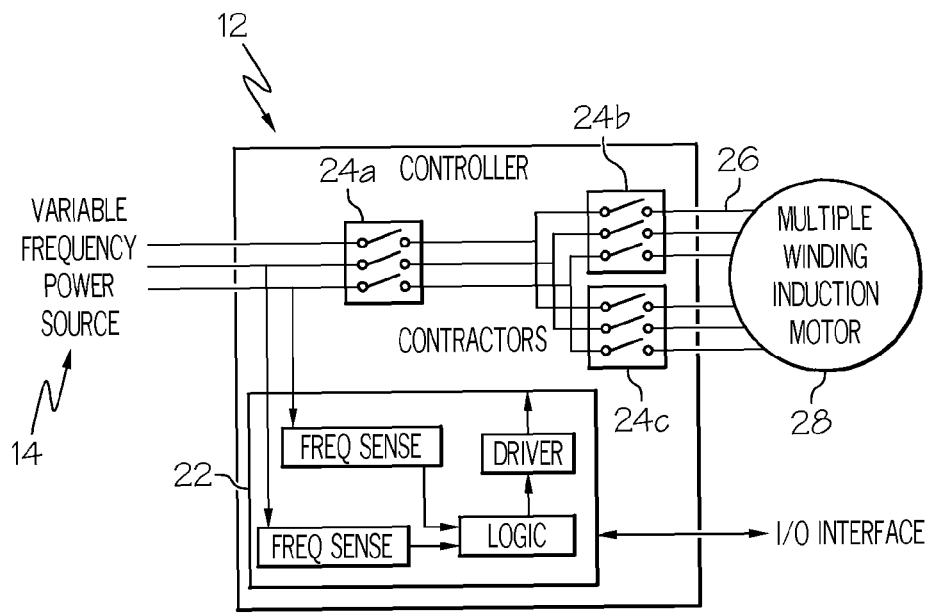
FIG. 2 is a simplified block diagram of a motor controller according to the present invention.

Referring to FIG. 2, there is shown a schematic diagram of the motor controller 12 of FIG. 1, according to the present invention. The motor controller 12 may consist of a circuit card assembly 22, three three-phase power switches 24a, 24b and 24c, and electrical connectors 26. FIG. 2 shows simplified controller block diagram. The switches 24a, 24b, 24c can be implemented using mechanical contactors or solid state switches. Two switches 24b, 24c may be used for switching power between the two motor windings of the motor 28. For an added safety feature, the third switch 24a may be used to provide backup capability to disconnect the power source 14 to the motor 28 when the frequency exceeds a preset safe operating limit for the motor speed. The power switches 24a, 24b, 24c may also be used to isolate the controller 12 from the AC power bus (not shown) in the event that certain controller or system faults are detected. These faults may include controller overvoltage and undervoltage, controller/motor overtemperature, etc. Due to the minimal power dissipation of the motor controller 12, force cooling may not be required for the controller 12.

Figure 3:
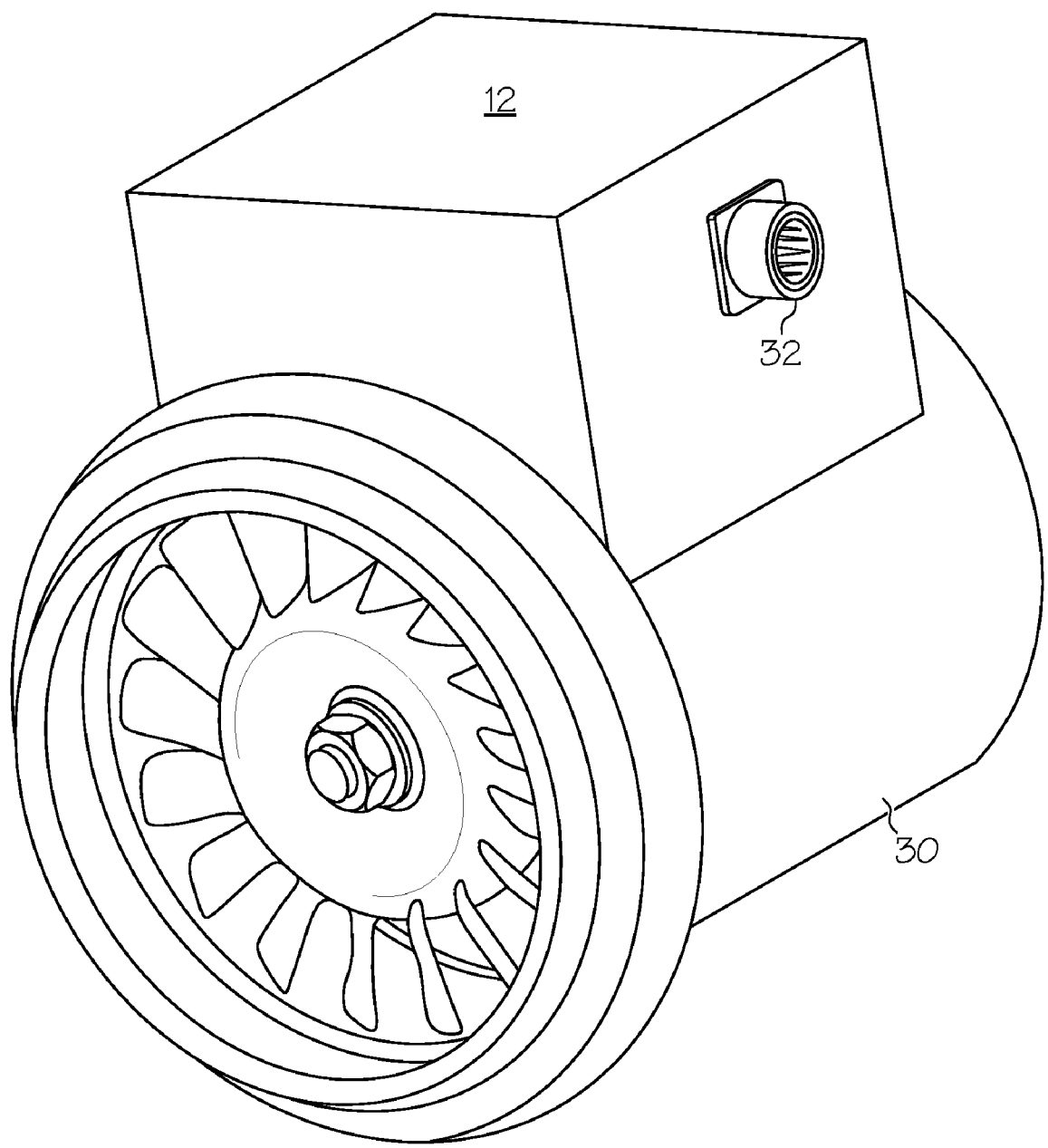
FIG. 3 is a perspective view of a motor controller integrated on a fan motor housing according to the present invention.

As shown in FIG. 3, there is shown a perspective view of the motor controller 12 integrated on a fan motor housing 30 according to the present invention. The motor controller 12 may be integrated into the fan housing 30 without the need for any additional cooling. Connector 32 may be present on the motor controller 12 for connecting the motor controller 12 to external power (not shown) or to an input/output (I/O) bus of an aircraft, for example.

Figure 4:
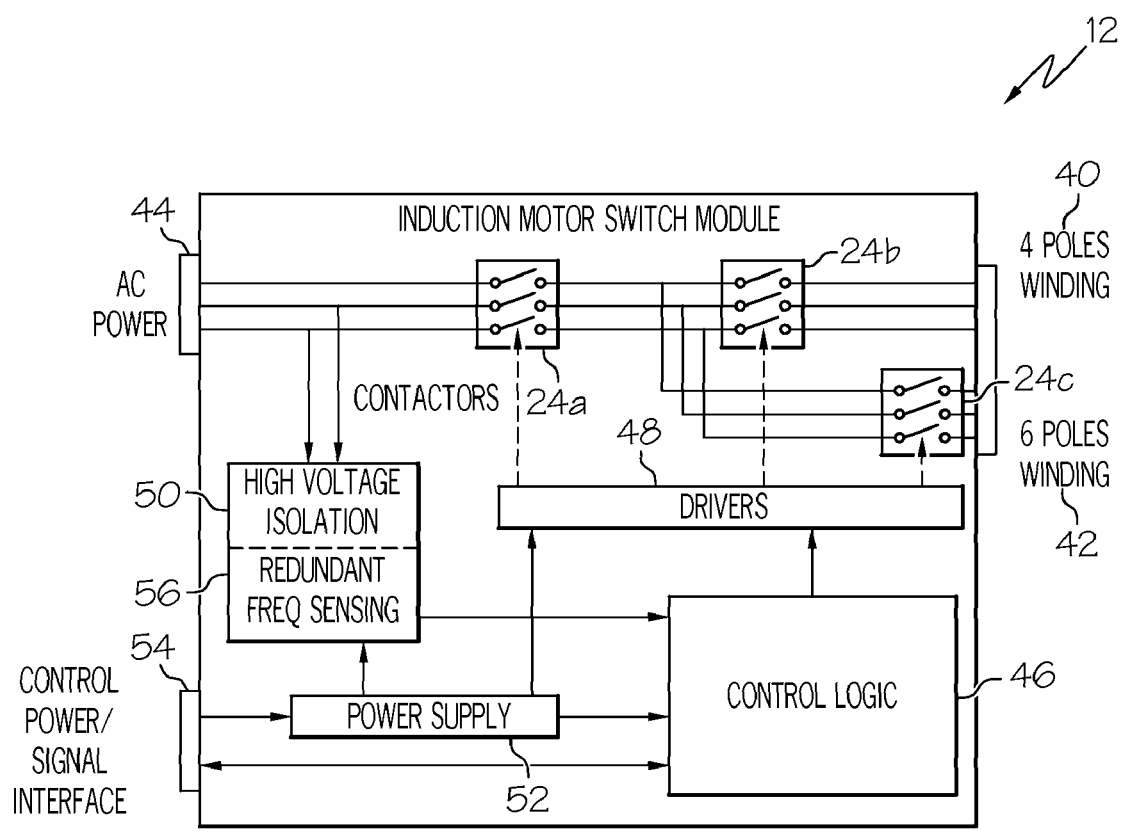
FIG. 4 is a functional block diagram of a motor controller according to the present invention.

Referring to FIG. 4, there is shown a functional block diagram of the motor controller 12 according to the present invention. Power switch 24b, also referred to as contactor 24b, may turn on and off a four-pole winding 40. Power switch 24c, also referred to as contactor 24c, may turn on and off a six-pole winding 42. The two contactors 24b, 24c may be interlocked by any conventional means, such as by using auxiliary contacts, to prevent simultaneous connection of both machine windings 40, 42 to a power bus 44. The system may be designed to operate safely up to a 650-Hz power supply. Above this frequency, both contactors 24b, 24c may open to prevent power having too high a frequency from reaching the windings 40, 42.

Control logic 46, as will be discussed in more detail below, may be used to determine which power switches 24a, 24b, 24c to open or close via drivers 48. A high voltage isolation circuit 50 may be provided to detect and isolate potentially dangerous high voltage surges from the AC power 44. An internal power supply 52 may provide power to the high voltage isolation circuit 50, the drivers 48 and the control logic 46. The internal power supply 52 may receive power via a control power/signal interface 54. The control logic 46 may send data (such as status of power switches 24a, 24b, 24c) out of the controller 12 via the control power/signal interface 54.

Additional hardware may be included in the controller 12 to ensure that the motor 28 may be operated within the designed speed limit. An isolation switch 24a (also referred to as power switch 24a, or contactor 24a) may be placed between the input AC variable-frequency distribution bus (also referred to as AC power 44) and the power switches 24b, 24c. The isolation switch 24a may normally be in an open condition. During controller initialization, controller power interruption or failure conditions in the controller 12, the isolation switch 24a may isolate the power source 44 from the motor 28 (see FIG. 2). Failure to disengage the machine windings 40, 42 above a present upper frequency limit may create an unsafe condition and electric machine overheating. Isolation switch 24a may also be used to mitigate the potential "Fail Closed" failure of power switches 24b, 24c. The selected contactors 24b, 24c may have a mean time between failures (MTBF) of 100,000 hours a failure rate of $1 \times 10^{-6}$. Using two contactors (e.g., contactors 24b, 24c along with isolation switch 24a) for the power shutoff function will result in a probability (Q) for $1 \times 10^{-12}$ for the inability to shut off power during an unsafe condition. To improve safety, a redundant frequency sensing circuit 56 may be added for dual-channel sensing of the frequency of the AC power 44. In case of disagreement between both channels, all contactors 24a, 24b, 24c of the system will open. If necessary, dual drivers (not shown) of the contactors 24a, 24b, 24c could be implemented. For additional safety, the motor 28 temperature may be monitored.

The controller 12 may optimize fan performance of an aircraft fan (see FIG. 3) by reducing the operating speed range for the induction motor 28 when driven by a power supply 44 with a wide-frequency range. The controller 12 may effectively limit both underperformance and overperformance by monitoring the frequency of the input power 44 and switching to the optimum motor winding (either motor winding 40 or motor winding 42, for example).

Figure 5:
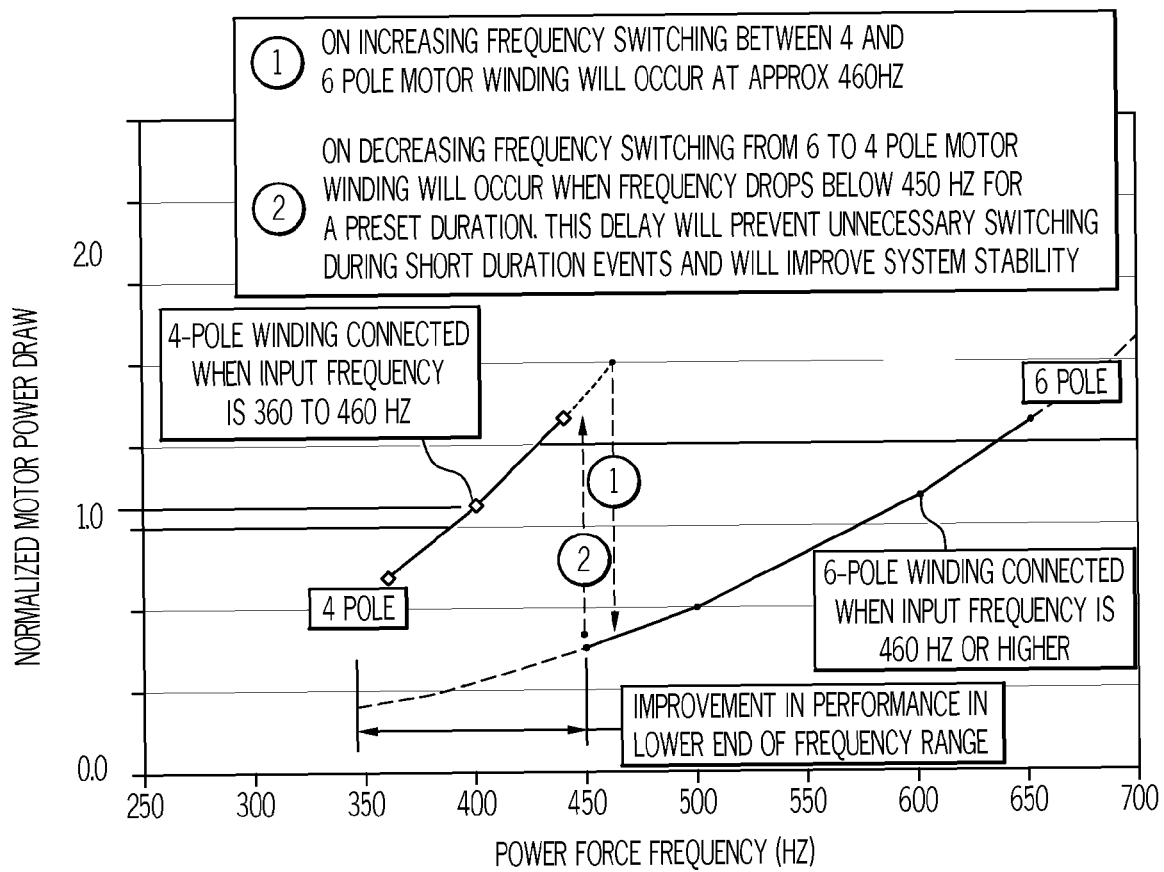
FIG. 5 is a graph presenting an example case for a 4+6-pole dual-winding induction-motor-driven fan as may be controlled by the motor controller of FIG. 4, according to the present invention.

Referring now to FIG. 5, there is shown a graph presenting an example case for a system having a 4+6-pole dual-winding induction-motor-driven fan as may be controlled by the controller 12 of FIG. 4, according to the present invention.

The system normally starts with the input power (e.g., AC power 44) at the lower end of the frequency range and with the control module (e.g., controller 12) selecting the four-pole winding (e.g., winding 40). The system may operate on the four-pole winding as long as the input power frequency remains in the range of 360 to 460 Hz. When the frequency exceeds approximately 460 Hz for a preset duration, the controller may switch off the four-pole winding (via, for example, opening switch 24b) and then engage the six-pole winding (e.g., winding 42, via closing switch 24c) after a short time delay. The system may then operate on the six-pole winding as long as the frequency remains in the range of 450 to 650 Hz. If the frequency exceeds approximately 650 Hz, the controller may disconnect both windings to prevent excessive power draw from the power supply and over-speed. The system may reconnect the six-pole winding when the frequency drops below 650 Hz. If the frequency decreases below approximately 450 Hz for a preset duration, the controller may switch off the six-pole winding and then engage the four-pole winding after a short time delay. The 450-to-460-Hz hysteresis band between the switch point frequencies may be necessary to avoid frequent switching between windings in the case where the input power frequency operates continuously in this range.

Figure 6:
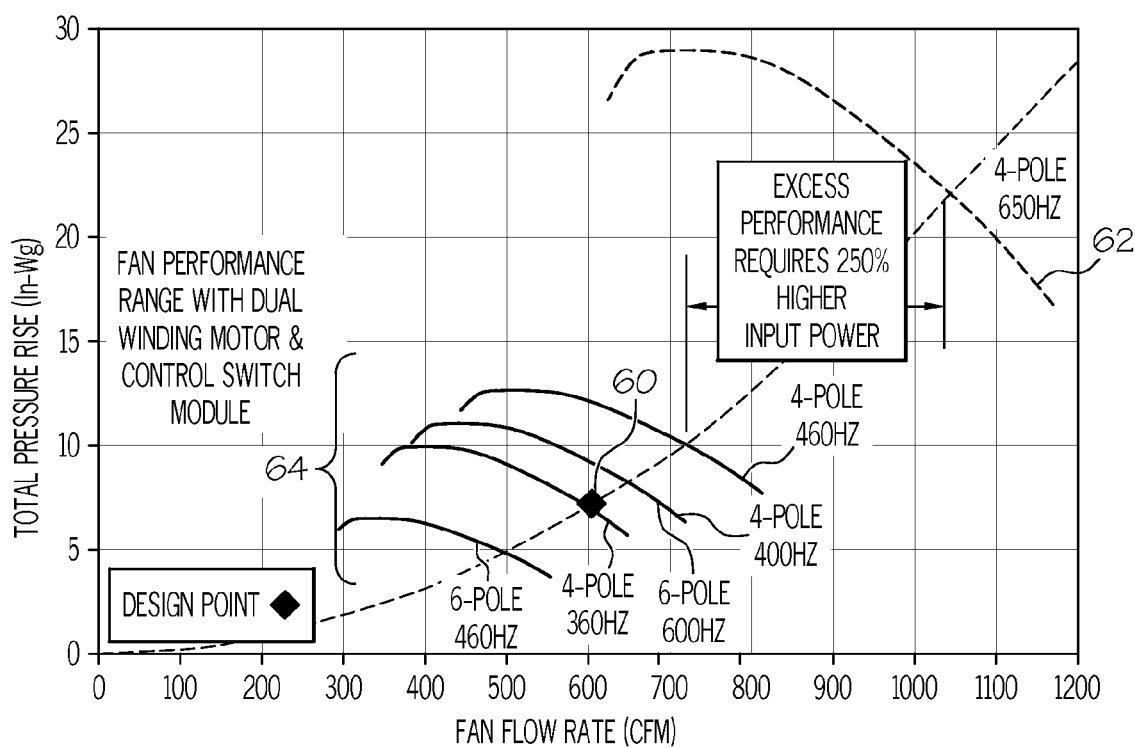
FIG. 6 is a graph showing the optimization accomplished with the motor controller and a dual-winding induction motor according to the present invention.

Referring to FIG. 6, there is shown a graph showing the optimization accomplished with the motor controller and a dual-winding induction motor according to the present invention. A fan in this case was designed to meet the required performance at noted design point 60 over the typical input power frequency range (400±40 Hz). If this fan were operated at a frequency of 650 Hz with a single-winding, 4-pole induction motor, it would attempt to run at the excessively high performance level shown by the upper performance curve 62. The maximum power draw would increase by nearly 250 percent in this case. This excess power draw and the corresponding increase in motor size and weight would be a severe penalty to the application.

With the controller and dual-winding induction motor according to the present invention, the fan performance can be controlled within the range shown by the lower performance curves 64 for the current example. These curves 64 correspond to the unit operating over the input power frequency range of 360 to 650 Hz. It would be possible to adjust the example frequency switching point (460 Hz) up or down as needed to further optimize for a specific application. The switching point can be adjusted up to provide performance margin in the case where continuous minimum performance is critical. The switching point could also be adjusted down to save additional unit size, weight, and power draw in cases where underperformance for a set duration would be acceptable.

The motor controller may also monitor the rate of change of the input frequency and command the switches (e.g., power switches 24a, 24b, 24c) based on this information to improve the performance of the system. For example, with high-speed processing, the controller can command the switch to operate at the zero crossing of the current to optimize hardware reliability.

One issue that may arise with variable frequency power supplies driving a motor may be the back generation of power from the load to the power bus. There are two conditions that potentially can cause a back generation of power. These conditions include switching from four to six poles or rapidly decreasing the source frequency. In general, regeneration from the load (such as a fan) to the power distribution is not permitted. To prevent regeneration and current transient when closing a spinning motor load to the power distribution, the controller may monitor the back EMF voltage of the motor. The control logic may ensure the voltage drop is below a predetermined level before connecting a new set of windings. For improved continuous operation, as an option, the controller can reconnect the motor with non-zero back EMF voltage. In this case, the controller may use the phase angle of the supply voltage and the back EMF voltage to determine the appropriate timing. To detect the rate of change in the source frequency, a dF/dT calculation may be performed. When the controller detects a large negative dF/dT, the power source may be isolated appropriately.

One method to prevent regeneration is to include a preset time delay into the logic to ensure zero back EMF voltage from the motor prior to every switch closing operation. The time delay may be based on the characteristics of the motor and the load.

Some of the advantages of the dual-winding motor control according to the present invention are as follows:
- Reduced controller weight (about four times lighter compared to the conventional approach);
- Improved reliability of at least three times compared to a conventional controller;
- Substantially lower cost (about four times due to the reduced number of components used);
- Much easier controller cooling since much fewer dissipating components are used;
- Efficiency may be much higher since the power pass goes only through two contactors, unlike conventional controllers where two three-phase bridges and two EMI filters are used. The efficiency of the controller may be improved at least 10 times for a controller with a power level of 4 kVA or higher;
- The controller of the present invention may contain a redundant isolation contactor from the supply bus in case the main comutating contactors fail;
- Time delay function may be implemented to prevent surge currents and prevent back generation to the bus;
- dF/dT protection may be implemented in switch timing to optimize system operation and prevent back generatrion to the bus;
- The controller may use frequency measurement for switching from one winding to another;
- Overfrequency protection may be implemented to prevent overloading of the electric drive and power source. This function may also protect the motor from overspeed;
- Zero crossing function may be implemented to prevent power quality and EMI issues, hence no EMI filter is required.

While the above description focused on a dual-winding induction motor, an induction machine with more than two windings can be used for further variation reduction of the speed. For example, an induction motor with three windings, a 4-pole winding, a 6-pole winding and an 8-pole winding may be controlled by a motor controller in a similar fashion as accomplished above to yield even less variation in the speed of, for example, a fan driven by the induction motor.

It should be understood, of course, that the foregoing relates to exemplary embodiments of the invention and that modifications may be made without departing from the spirit and scope of the invention as set forth in the following claims.

We claim:

1. A method for controlling speed variation in a motor, the method comprising:
measuring a frequency of a power supply going to the motor, the motor having at least a first set of windings and a second set of windings;
delivering power to the first set of windings when the frequency is within a first frequency range;
delivering power to the second set of windings when the frequency is within a second frequency range; and
assuring that there is no back generation of power from a load to the power supply before switching power delivery from any one of the sets of windings to another one of the sets of windings.

2. The method of claim 1, further comprising:
configuring the first set of windings with a first number of poles and configuring the second set of windings with a second number of poles, wherein the first number of poles is greater than the second number of poles;
wherein at least a portion of the first frequency range is greater than the second frequency range.

3. The method of claim 1, further comprising configuring the first set of windings with four poles and configuring the second set of windings with six poles.

4. The method of claim 1, further comprising disconnecting the power supply to the motor when the frequency of the power supply exceeds a preset maximum frequency.

5. The method of claim 1 wherein the step of assuring that there is no back generation of power comprises monitoring the back EMF voltage of the motor.

6. The method of claim 1 wherein the step of assuring that there is no back generation of power comprises waiting a preset time interval when the frequency of the power supply moves from the first frequency range to the second frequency range or when the frequency of the power supply moves from the second frequency range to the first frequency range.

7. The method of claim 1 wherein the step of assuring that there is no back generation of power comprises:
determining a change of the frequency of the power supply with respect to time (dF/dt); and
isolating the power supply from the motor when (dF/dt) is negative and when the absolute value of (dF/dt) is greater than a preset maximum change.

8. The method of claim 1, further comprising carrying out the method without supplemental cooling of a controller.

9. The method of claim 1, further comprising connecting either the first set of windings or the second set of windings to the power supply via power switches.

10. The method of claim 9, wherein the power switches are at least one of mechanical contactors or solid state switches.

11. The method of claim 1, further comprising delivering power to a third set of windings when the frequency is within a third frequency range.

12. A method for limiting speed variation of a motor driven by a variable frequency power distribution system by switching fed power from a first set of windings to a second set of windings, the method comprising:
feeding power from the power distribution system into a motor controller;
monitoring a frequency of the fed power with the motor controller to determine if the frequency of the fed power is within a first or a second frequency range;
delivering the fed power to the first set of windings having a first number of poles when the frequency is within the first frequency range;
determining a phase angle of supply voltage and back EMF voltage of the motor when the frequency of the fed power enters the second frequency range;
switching the fed power to the second set of windings having a second number of poles when the frequency is within the second frequency range and when the phase angle and back EMF are such that there is no back-generated power produced by such switching and wherein the first number of poles is greater than the second number of poles;

at least a portion of the first frequency range is greater than the second frequency range; and at least a portion of the first frequency range overlaps with a portion of the second frequency range.

13. The method of claim 12 wherein the step of switching comprises:

waiting a time interval until the back EMF voltage is zero.

14. The method of claim 12 further comprising:

determining a change of the frequency of the fed power with respect to time (dF/dt); and isolating the power distribution system from the motor when (dF/dt) is negative and when the absolute value of (dF/dt) is greater than a preset maximum change.

15. The method of claim 12, further comprising isolating the power distribution system from the motor when the frequency of the fed power exceeds a predetermined maximum frequency.

16. A controller for controlling a motor having at least a first set of windings and a second set of windings, the controller comprising:

a circuit for reading a frequency of power on an AC bus;

a first switch for directing power to the first set of windings when the frequency is in a first frequency range;

a second switch for directing power to the second set of windings when the frequency is in a second frequency range; and a control logic for delaying actuation of the second switch unless and until there is no back-generated power from a load to the AC bus.

17. The controller of claim 16, further comprising a third switch for isolating the power from the motor when the frequency of the power exceeds a predetermined maximum frequency.

18. The controller of claim 16, wherein the first set of windings has a first number of poles and the second set of windings has a different, second number of poles.

19. The controller of claim 16 wherein the control logic:

determines a change of the frequency of power on the AC bus with respect to time (dF/dt); and isolates the AC bus from the motor when (dF/dt) is negative and when the absolute value of (dF/dt) is greater than a preset maximum change.

20. The controller of claim 16 wherein the control logic circuit detects a back EMF voltage and prevents the first switch and the second switch from opening or closing when back EMF voltage is present.

* * * * *